US008679626B2

(12) United States Patent
Heo et al.

(10) Patent No.: US 8,679,626 B2
(45) Date of Patent: Mar. 25, 2014

(54) CARBON FIBER INCLUDING CARBON FIBER CORE COATED WITH DIELECTRIC FILM, AND FIBER-BASED LIGHT EMITTING DEVICE INCLUDING THE CARBON FIBER

(75) Inventors: Jeong-na Heo, Yongin-si (KR); Yong-chul Kim, Seoul (KR); Ha-jin Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1208 days.

(21) Appl. No.: 12/571,826

(22) Filed: Oct. 1, 2009

(65) Prior Publication Data

US 2010/0187973 A1 Jul. 29, 2010

(30) Foreign Application Priority Data

Jan. 28, 2009 (KR) ........................ 10-2009-0006614

(51) Int. Cl.
*B32B 9/00* (2006.01)

(52) U.S. Cl.
USPC ........... 428/367; 428/375; 428/379; 428/389; 428/408

(58) Field of Classification Search
None
See application file for complete search history.

(56) References Cited

U.S. PATENT DOCUMENTS

| | | | | |
|---|---|---|---|---|
| 3,736,109 | A * | 5/1973 | Darling | 428/656 |
| 3,796,587 | A * | 3/1974 | Sara | 75/330 |
| 4,376,803 | A * | 3/1983 | Katzman | 428/408 |
| 4,376,804 | A * | 3/1983 | Katzman | 428/408 |
| 4,962,070 | A * | 10/1990 | Sullivan | 501/95.1 |
| 7,968,191 | B2 * | 6/2011 | Hampden-Smith et al. | 428/408 |
| 2003/0025432 | A1 | 2/2003 | Nakamura et al. | |
| 2008/0157649 | A1 * | 7/2008 | Wei et al. | 313/495 |
| 2008/0265767 | A1 * | 10/2008 | Baumberg et al. | 313/511 |
| 2010/0055002 | A1 * | 3/2010 | Lee | 422/121 |
| 2010/0187973 | A1 * | 7/2010 | Heo et al. | 313/498 |

FOREIGN PATENT DOCUMENTS

| | | |
|---|---|---|
| CN | 1427652 | 7/2003 |
| JP | 04-363893 | 12/1992 |
| JP | 2003-157756 | 5/2003 |
| JP | 2007-258004 | 10/2007 |
| KR | 1020020091640 A | 12/2002 |
| KR | 1020040070561 A | 8/2004 |
| KR | 1020080067817 A | 7/2008 |

* cited by examiner

*Primary Examiner* — Jill Gray
(74) *Attorney, Agent, or Firm* — Cantor Colburn LLP

(57) ABSTRACT

Provided are a carbon fiber including a carbon fiber core coated with a metal oxide film, and a light-emitting device including the carbon fiber. A method of manufacturing the carbon fiber is disclosed.

13 Claims, 4 Drawing Sheets

CARBON FIBER INCLUDING CARBON FIBER CORE COATED WITH DIELECTRIC FILM, AND FIBER-BASED LIGHT EMITTING DEVICE INCLUDING THE CARBON FIBER

CROSS-REFERENCE TO RELATED APPLICATIONS

This application claims priority to Korean Patent Application No. 10-2009-0006614, filed on Jan. 28, 2009, and all the benefits accruing therefrom under 35 U.S.C. 119, the content of which in its entirety is herein incorporated by reference.

BACKGROUND

1. Field

The present disclosure relates to a carbon fiber including a carbon fiber core coated with a dielectric film, a light-emitting device including the carbon fiber, and a method of manufacturing the carbon fiber.

2. Description of the Related Art

With the rapid development of information communications technology, image display devices for delivering various types of information to a user or to the public, are in greater demand, must provide more user content, and hence improved image display devices have become increasingly more important.

Cathode ray tubes ("CRTs"), one of the most widely used types of image display device, are heavy and large. A useful and desirable alternative includes inexpensive, lightweight flat panel display devices that have high luminance, high efficiency, high resolution, high-speed response characteristics, long lifetimes, low driving voltage, low power consumption, and natural-color display characteristics.

Examples of conventional flat panel display devices include liquid crystal displays ("LCDs"), plasma display panels ("PDPs"), electroluminescent displays ("ELDs"), and field emission displays ("FEDs"). Of these, ELDs are active type solid display devices that emit light when exposed to high electric fields, and may be applied in personal communication services ("PCS") terminals, electro-electric products and various display panels.

In 1936, O. W. Destriau observed an electroluminescent ("EL") phenomenon which occurs when an alternative electric field is applied to an inorganic crystal powder of ZnS:Cu between two electrodes. Subsequently, research into inorganic powder based EL materials has been performed and various ZnS-based light-emitting inorganic sources have been developed. Examples of ZnS-based light-emitting inorganic sources that have been developed include ZnS:Tb (F,O); ZnS:Cu (Cl,Br); ZnS:Mn,Cu (Cl,Br); ZnS:Pr; ZnS:Mn; ZnS:Ce; and ZnS:Tb.

Inorganic electroluminescence, however, requires a high driving voltage because a fluorescent material is directly excited. Such a high driving voltage leads to a high likelihood of short circuits and thus, it is difficult to manufacture small devices from inorganic EL materials.

SUMMARY

Disclosed herein is, in one or more embodiments, a carbon fiber including: a carbon fiber core; and a uniform, dense dielectric film coated on the carbon fiber core.

One or more embodiments include a carbon fiber including: a carbon fiber core; a dielectric film coated on the carbon fiber core; and a fluorescent film coated on the dielectric film.

One or more embodiments include a fiber-based light-emitting device including a carbon fiber, wherein the carbon fiber includes a carbon fiber core, a dielectric film coated on the carbon fiber core, and a fluorescent film coated on the dielectric film.

One or more embodiments include a method of manufacturing a carbon fiber including a carbon fiber core coated with a dielectric film, the method including anodizing a metal film formed on the carbon fiber core, thereby forming the dielectric film on the carbon fiber core.

Additional aspects will be set forth in part in the description which follows and, in part, will be apparent from the description, or may be learned by practice of the embodiments.

To achieve the above and/or other aspects, one or more embodiments may include a carbon fiber including: a carbon fiber core; and a dielectric film coated on the carbon fiber core.

The diameter of the carbon fiber core may be about 1 μm to about 1 mm.

The dielectric constant of the dielectric film may be about 5 to about 500.

The breakdown field strength of the dielectric film may be in a range of about 1 megavolt per centimeter (MV/cm) to about 50 MV/cm.

The thickness of the dielectric film may be about 0.01 μm to about 100 μm.

The dielectric film may include one metal oxide selected from the group consisting of $Al_2O_3$, $SiO_2$, $TiO_2$, $V_2O_3$, $WO_3$, $Ta_2O_5$ $Nb_2O_5$, and any combination thereof.

To achieve the above and/or other aspects, one or more embodiments may include a carbon fiber including: the carbon fiber described above; and a fluorescent film coated on the dielectric film.

To achieve the above and/or other aspects, one or more embodiments may include a fiber-based light-emitting device including the carbon fiber described above.

To achieve the above and/or other aspects, one or more embodiments may include a method of manufacturing a carbon fiber including a carbon fiber core coated with a dielectric film, the method including anodizing a metal film formed on the carbon fiber core, thereby forming the dielectric film on the carbon fiber core.

The diameter of the carbon fiber core may be about 1 μm to about 1 mm.

The metal film may include a metal selected from the group consisting of Al, Si, Ti, V, W, Ta, Nb, alloys thereof, and any combination thereof.

The dielectric constant of the dielectric film may be about 5 to about 500.

The breakdown field strength of the dielectric film may be about 1 MV/cm to about 50 MV/cm.

The thickness of the dielectric film may be about 0.01 μm to about 100 μm.

The dielectric film may include a metal oxide selected from the group consisting of $Al_2O_3$, $SiO_2$, $TiO_2$, $V_2O_3$, $WO_3$, $Ta_2O_5$, $Nb_2O_5$, and any combination thereof.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A carbon fiber according to an embodiment includes: a carbon fiber core; and a dielectric film coated on the carbon fiber core.

Figure 1:
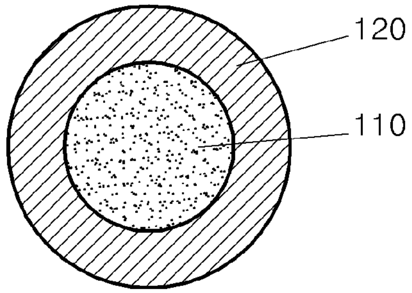
FIG. 1 is a schematic sectional view of an exemplary carbon fiber including a carbon fiber core coated with a dielectric film, according to an embodiment.

FIG. 1 is a schematic sectional view of the carbon fiber including the carbon fiber core coated with the dielectric film.

Referring to FIG. 1, the carbon fiber core 110 is surrounded by the dielectric film 120.

The carbon fiber core 110 may be formed of any known carbon fiber material. According to an embodiment, the diameter of the carbon fiber core is not limited, and, for example, may be about 1 μm to about 1 mm.

The carbon fiber core coated with the dielectric film according to the current embodiment may be used in, for example, a fiber-based light-emitting device. If the diameter of the carbon fiber core is less than about 1 μm, the carbon fiber core may be easily broken in, for example, the process of manufacturing the carbon fiber. Alternatively, if the diameter of the carbon fiber core is greater than about 1 mm, the carbon fiber core is not suitable for use in a fiber-based light-emitting device.

That is, if the diameter of the carbon fiber core is greater than about 1 mm or smaller than about 1 μm and the carbon fiber core is used in, for example, a fiber-based light-emitting device, problems such as fiber breakage may occur when manufacturing the fiber-based light-emitting device. Similarly, when used in other applications or fiber-based light-emitting devices that are relatively large (greater than about 1 mm diameter), the diameter of the carbon fiber core would be outside of the useful range of diameters for the desired applications, as described above.

According to an embodiment, the dielectric constant of the dielectric film 120 may be about 5 to about 500, and specifically about 5 to about 8. The breakdown field strength of the dielectric film may be about 1 megavolt per centimeter (MV/cm) to about 50 MV/cm, and more specifically about 5 MV/cm to about 12 MV/cm. The thickness of the dielectric film may be about 0.01 μm to about 100 μm, and more specifically about 0.1 on to about 10 μm.

If the carbon fiber including the carbon fiber core coated with the dielectric film is used in, for example, a light-emitting device, the dielectric film needs to have the above relatively high ranges of dielectric constants and breakdown field strength and also needs to have a small, uniform thickness, to obtain high electroluminance in the light-emitting device. Such needs may be satisfied with the ranges of dielectric constant, breakdown field strength and thickness described above and the carbon fiber including the carbon fiber core coated with the dielectric film may perform appropriate functions.

Also, the dielectric film 120 should have excellent electron injection characteristics, excellent surface morphology and a minimum number of pin hole defects as possible, where such defects can cause a decrease in, for example, the breakdown field strength. Accordingly, in order to satisfy these needs, the dielectric film may be formed of a metal oxide selected from the group consisting of $Al_2O_3$, $SiO_2$, $TiO_2$, $V_2O_3$, $WO_3$, $Ta_2O_5$ $Nb_2O_5$, and any combination thereof. More than one layer of metal oxide may be used. In an embodiment, the dielectric film is a dense dielectric film, i.e., has low structural porosity/free volume of less than 0.5% of the volume of the dielectric film. In another embodiment, the dielectric film is uniformly coated on the carbon fiber, where "uniformly" as disclosed herein means that the thickness of the dielectric film varies by less than 10%, specifically less than 5%, and more specifically less than 1% over the entire length of the carbon fiber.

Figure 2:
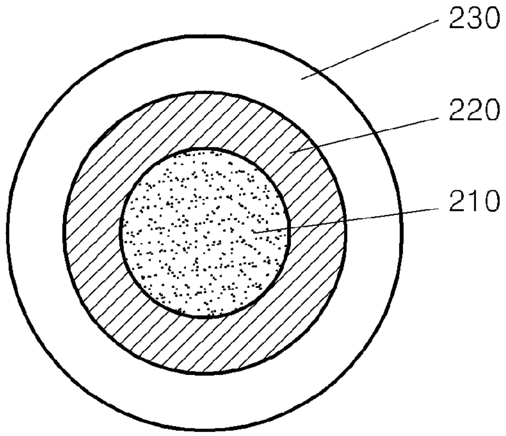
FIG. 2 is a schematic sectional view of an exemplary carbon fiber according to another embodiment, wherein a dielectric film is coated on the carbon fiber core and a fluorescent film is coated on the dielectric film.

FIG. 2 is a schematic sectional view of a carbon fiber according to another embodiment, wherein the carbon fiber includes a carbon fiber core 210, a dielectric film 220 coated on the carbon fiber core and a fluorescent film 230 coated on the dielectric film.

The fluorescent film 230 may be formed of an inorganic fluorescent material that is conventionally used to manufacture inorganic light-emitting devices. For example, ZnS-based light-emitting inorganic materials may be used. Exemplary ZnS-based light-emitting inorganic materials include ZnS:Tb (F,O); ZnS:Cu (Cl,Br); ZnS:Mn,Cu (Cl,Br); ZnS:Pr; ZnS:Mn; ZnS:Ce; and ZnS:Tb. The thickness of the fluorescent film may be a few μm to hundreds of μm.

The fluorescent film 230 may be coated on the dielectric film 220 using a conventional technique, such as dip coating, spray coating, or the like.

The carbon fiber 210 including the fluorescent film 230 according to the current embodiment may be used in a fiber-based light-emitting device.

Figure 6:
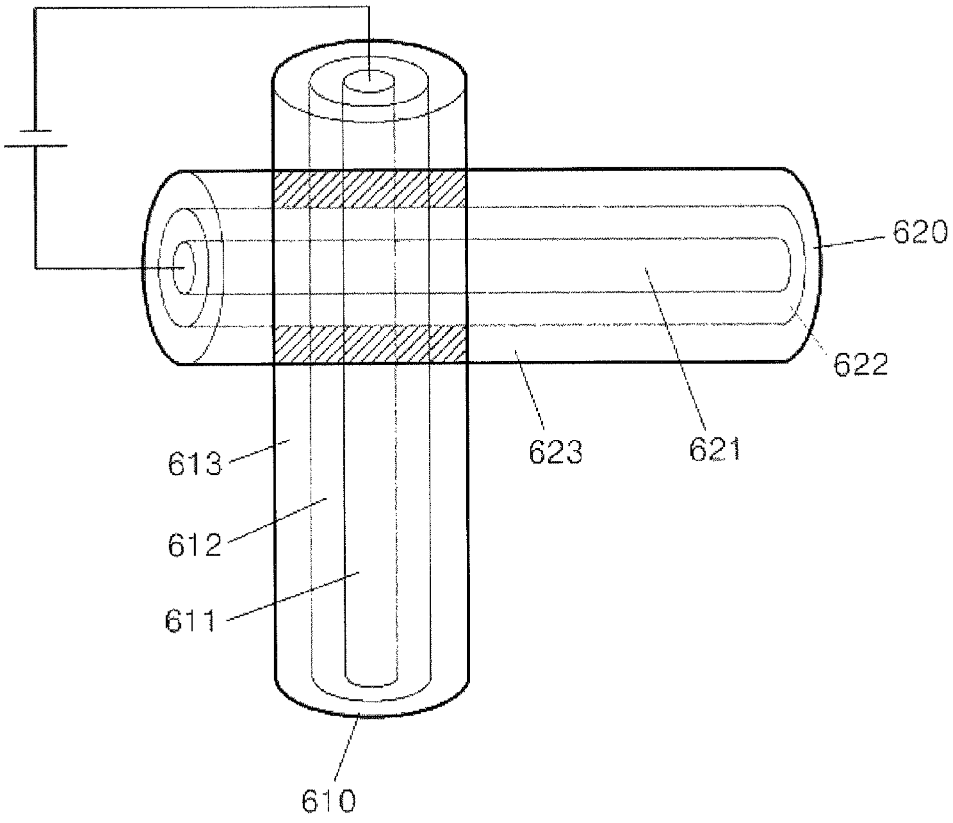
FIG. 6 is a schematic diagram of an exemplary fiber-based light-emitting device according to an embodiment.

For carbon fibers having the structure illustrated in FIG. 2 according to the current embodiment, when at least two such carbon fibers are crossed and brought into contact each other, one carbon fiber acts as a first electrode and the other carbon fiber acts as a second electrode. Thus, when a voltage is applied to the respective carbon fibers, a current flows from the carbon fiber constituting the first electrode to the other carbon fiber constituting the second electrode and the fluorescent films of the carbon fiber emits light. To illustrate this, FIG. 6 shows a schematic diagram of a fiber-based light-emitting device according to an embodiment in which a first carbon fiber 610 including carbon fiber core 611, dielectric coating 612, and fluorescent film 613, crosses a second carbon fiber 620 which includes carbon fiber core 621, dielectric coating 622, and fluorescent film 623; where a voltage is applied to the carbon fibers 610 and 620, the fluorescent films 613 and 623 each emit light.

If the carbon fiber including the dielectric film 220 and the fluorescent film 230 illustrated in FIG. 2 is used alone in a fiber-based light-emitting device, a second electrode (not shown) may be disposed on the fluorescent film. In this case, the carbon fiber core acts as the first electrode, and when a voltage is applied to the carbon fiber and the second electrode, the fluorescent film 230 emits light.

A method of manufacturing a carbon fiber including a carbon fiber core coated with a dielectric film, according to an embodiment, will now be described in detail.

Figure 3:
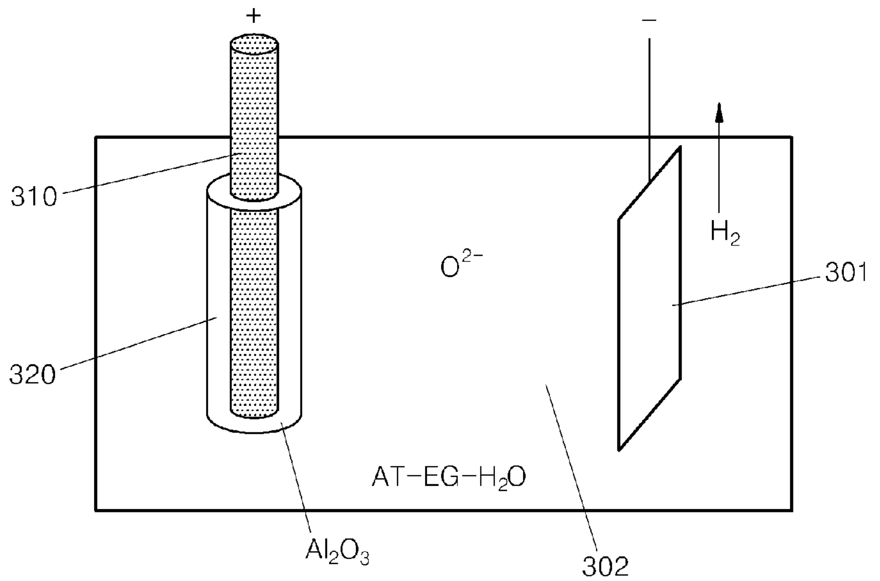
FIG. 3 is a schematic diagram showing an exemplary method of manufacturing a carbon fiber, according to an embodiment.

FIG. 3 is a schematic diagram for explaining a method of manufacturing a carbon fiber including a carbon fiber core coated with a dielectric film, according to an embodiment.

The method according to the current embodiment may include anodizing a metal film formed on the carbon fiber core to form the dielectric film on the carbon fiber core.

The carbon fiber core may be formed of any material that is used in the art as described above, and the diameter of the carbon fiber core is also not limited. For example, the diameter of the carbon fiber core may be about 1 μm to about 1 mm.

If the diameter of the carbon fiber core is outside this range and the carbon fiber core is used in, for example, a fiber-based light-emitting device, problems such as fiber breakage may occur when manufacturing the fiber-based light-emitting device. Similarly, when used in other applications or fiber-based light-emitting devices that are relatively large (greater than about 1 mm diameter), the diameter of the carbon fiber core may be outside of the useful range for the desired applications, as described above.

The metal film may be formed on the carbon fiber core by using any method. For example, a plating method may be used. The metal film may be formed of a metal selected from the group consisting of Al, Si, Ti, V, W, Ta, Nb, alloys thereof, and any combination thereof.

The dielectric constant, breakdown field strength, and dielectric film of the dielectric film, described hereinabove, are obtained by forming the dielectric film according to the method.

Anodizing is performed on a carbon fiber, which has previously been plated with a metal film, using a conventional method. An exemplary method is illustrated in FIG. 3. As shown in FIG. 3, a carbon fiber 310, acting as the positive electrode in an anodizing bath, is anodized to form the dielectric film 320 in the presence of an anodizing solution 302. A counter electrode 301 is present in the bath. The solution 302 used in the anodizing process may be any solution that contains oxygen atom, for example, an ammonium tartrate ("AT")-ethylene glycol ("EG")-water solution as illustrated in FIG. 3. An electrolytic solution used may be selected from a sulfuric acid, chromic acid, ammonium tartrate, aromatic sulfonic acids (for integral colors in the dielectric film), a sulfuric acid—metal salt mixture (for electrolytically deposited colors in the dielectric film), and a sulfuric acid—oxalic acid combination (to form a hard anodic coating). In addition, boric acid ($H_3BO_3$) or sodium tetraborate decahydrate ($Na_2B_4O_7.10H_2O$) may be added to the solution used in the anodizing process.

In FIG. 3, a carbon fiber 310 plated with a metal that is to be oxidized acts as one electrode and a Pt electrode acts as a counter electrode 301. Herein, the counter electrode 301 is not limited to being formed of Pt. A current is supplied to the respective electrodes at a predetermined voltage for an adjusted time period. In this case, at the carbon fiber electrode, the metal film of the carbon fiber 310 is oxidized and the resultant metal oxide is coated on the carbon fiber core to form the dielectric film 320, while at the Pt electrode, a reduction reaction is performed and hydrogen is generated in the anodic plating bath.

The dielectric film formed in such a manner as described above may be formed of a metal oxide selected from the group consisting of $Al_2O_3$, $SiO_2$, $TiO_2$, $V_2O_3$, $WO_3$, $Ta_2O_5$, $Nb_2O_5$, and any combination thereof, according to the metal film.

The method of manufacturing a carbon fiber coated with the dielectric film is carried out at ambient temperatures, and does not require a high-temperature process (e.g., one performed at typical temperatures of about 800° C. or higher). In addition, the method advantageously uses carbon fiber instead of metallic fiber and has excellent heat resistance, chemical resistance, and is not limited as to chemical conditions.

Figure 4:
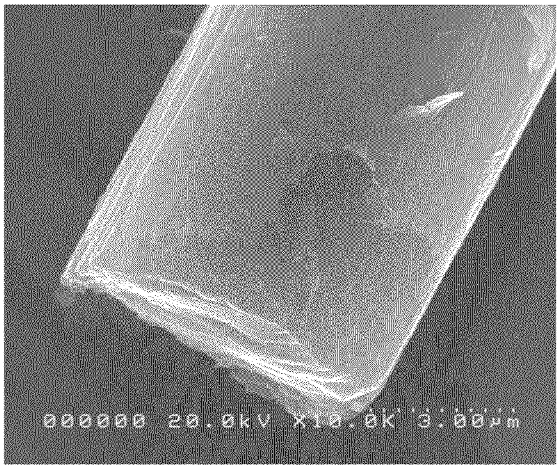
FIG. 4 is a scanning electron microscopic ("SEM") image of an exemplary carbon fiber including a carbon fiber coated with a dielectric film, according to an embodiment.
Figure 5:
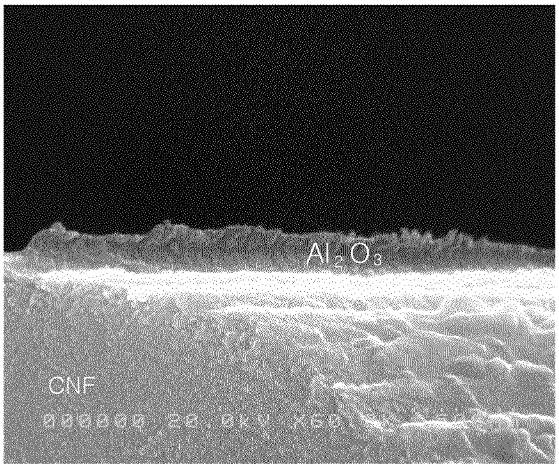
FIG. 5 is another SEM image of the exemplary carbon fiber of FIG. 4.

FIG. 4 is a scanning electron microscopic (SEM) image of a carbon fiber including a carbon fiber core coated with a dielectric film according to an embodiment, and FIG. 5 is another SEM image of the carbon fiber of FIG. 4. The SEM image of FIG. 5 also shows the dielectric film. Referring to FIG. 5, "CNF" denotes the cross-sectional view of the carbon nano fiber constituting the carbon fiber core, and $Al_2O_3$ constitutes the dielectric film surrounding the carbon fiber core.

Referring to FIGS. 4 and 5, it may be seen that a dielectric film formed of $Al_2O_3$ is densely, uniformly coated on a carbon fiber core.

One or more embodiments will be described in further detail with reference to the following examples. These examples are for illustrative purposes only and are not intended to limit the scope of the present embodiments.

Plating of Carbon Fiber Core

Al Plating

Al was plated on a 10 μm carbon fiber core to a uniform thickness of about 1,000 Å by sputtering.

Anodizing of Plated Carbon Fiber Core

Example 1

The Al-plated carbon fiber core was immersed in an aqueous sulfuric acid (15 vol %) solution and a stainless steal structure was used as a counter electrode. A current of 4 mA was supplied to the Al-plated carbon fiber core and the counter electrode at 50 V for 5 minutes, thereby oxidizing the Al plated on the carbon fiber core into $Al_2O_3$ to form a dielectric film having a thickness of 0.1 μm.

Manufacture of Fiber-Based Light-Emitting Device

Example 2

FIG. 6 is a schematic diagram of a fiber-based light-emitting device according to an embodiment.

A film of ZnS particles was coated on the carbon fiber including the carbon fiber core coated with the dielectric film manufactured according to Example 1. Two such carbon fibers, identically prepared, were crossed and brought into contact each other (as illustrated in FIG. 6), and then a current of 100 mA was supplied to the respective carbon fibers at a voltage of 200 V. As a result, light was emitted.

As described above, according to the one or more of the above embodiments, a carbon fiber including a carbon fiber core coated with a dielectric film may be used in a fiber-based light-emitting device.

A method of manufacturing a carbon fiber including a carbon fiber core coated with a dielectric film does not include a high-temperature heat treatment process. Accordingly, thermal deformation may not occur and an available substrate is not limited.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A carbon fiber comprising:

a carbon fiber core; and a dielectric film coated on and surrounding the carbon fiber core, and a fluorescent film coated on and surrounding the dielectric film.

2. The carbon fiber of claim 1, wherein a diameter of the carbon fiber core is about 1 μm to about 1 mm.

3. The carbon fiber of claim 1, wherein the dielectric constant of the dielectric film is about 5 to about 500.

4. The carbon fiber of claim 1, wherein the breakdown field strength of the dielectric film is about 1 MV/cm to about 50 MV/cm.

5. The carbon fiber of claim 1, wherein the thickness of the dielectric film is about 0.01 μm to about 100 μm.

6. The carbon fiber of claim 1, wherein the dielectric film comprises a metal oxide selected from the group consisting of $Al_2O_3$, $SiO_2$, $TiO_2$, $V_2O_3$, $WO_3$, $Ta_2O_5$, $Nb_2O_5$, and any combination thereof.

7. A fiber-based light-emitting device comprising the carbon fiber of claim 1.

8. A method of manufacturing a carbon fiber comprising a carbon fiber core coated with a dielectric film, the method comprising anodizing a metal film formed on the carbon fiber core, thereby forming the dielectric film on the carbon fiber core, wherein the dielectric film comprises a metal oxide selected from the group consisting of $Al_2O_3$, $SiO_2$, $TiO_2$, $V_2O_3$, $WO_3$, $Ta_2O_5$, $Nb_2O_5$, and any combination thereof.

9. The method of claim 8, wherein a diameter of the carbon fiber is about 1 μm to about 1 mm.

10. The method of claim 8, wherein the metal film comprises a metal selected from the group consisting of Al, Si, Ti, V, W, Ta, Nb, alloys thereof, and any combination thereof.

11. The method of claim 8, wherein the dielectric constant of the dielectric film is about 5 to about 500.

12. The method of claim 8, wherein the breakdown field strength of the dielectric film is about 1 MV/cm to about 50 MV/cm.

13. The method of claim 8, wherein the thickness of the dielectric film is about 0.01 μm to about 100 μm.

* * * * *